United States Patent
Paolini et al.

(10) Patent No.: US 9,982,413 B2
(45) Date of Patent: May 29, 2018

(54) CAB SUSPENSION SYSTEM FOR A WORK VEHICLE

(71) Applicant: CNH Industrial America LLC, New Holland, PA (US)

(72) Inventors: Francesco Paolini, Modena (IT); Alessandro Benevelli, Albinea (IT); John Cloud, Wichita, KS (US); Daniel Seacat, Valley Center, KS (US)

(73) Assignee: CNH Industrial America LLC, New Holland, PA (US)

( * ) Notice: Subject to any disclaimer, the term of this patent is extended or adjusted under 35 U.S.C. 154(b) by 59 days.

(21) Appl. No.: 15/284,204

(22) Filed: Oct. 3, 2016

(65) Prior Publication Data

US 2018/0094404 A1 Apr. 5, 2018

(51) Int. Cl.
*B60N 99/00* (2006.01)
*E02F 9/16* (2006.01)
*B62D 33/067* (2006.01)
*B62D 33/06* (2006.01)
*F16F 13/00* (2006.01)

(52) U.S. Cl.
CPC .......... *E02F 9/166* (2013.01); *B62D 33/0604* (2013.01); *B62D 33/067* (2013.01); *B62D 33/0617* (2013.01); *F16F 13/007* (2013.01)

(58) Field of Classification Search
CPC . E02F 9/166; B62D 33/0604; B62D 33/0617; B62D 33/067; F16F 13/007
See application file for complete search history.

(56) References Cited

U.S. PATENT DOCUMENTS

| | | | |
|---|---|---|---|
| 3,944,017 A | 3/1976 | Foster | |
| 4,330,149 A | 5/1982 | Salmon | |
| 8,517,456 B1 * | 8/2013 | Eng | B62D 33/0608 280/124.179 |
| 8,807,633 B2 * | 8/2014 | Milburn | B62D 33/0604 280/756 |
| 2008/0245589 A1 | 10/2008 | Akeson et al. | |
| 2011/0266727 A1 | 11/2011 | Knevels | |
| 2012/0193157 A1 * | 8/2012 | Rasset | B60R 21/131 180/89.13 |

(Continued)

FOREIGN PATENT DOCUMENTS

| | | |
|---|---|---|
| CN | 103072639 | 5/2013 |
| JP | H07101360 | 4/1995 |

*Primary Examiner* — Lori L Lyjak
(74) *Attorney, Agent, or Firm* — Peter K. Zacharias; Patrick M. Sheldrake

(57) ABSTRACT

A cab suspension system for a work vehicle includes a front suspension assembly having a bracket configured to fixedly couple to a frame of a cab of the work vehicle. In addition, the front suspension assembly includes a support element having a torsion bar and a pair of longitudinal supports. Each of the pair of longitudinal supports is configured to rotatably couple to a chassis of the work vehicle. The front suspension assembly also includes a damping assembly coupled to the support element and configured to couple to the chassis. The bracket is rotatably coupled to the support element at a pivot joint assembly, and the bracket is configured to position the pivot joint assembly forward of the cab relative to a direction of travel of the work vehicle while the bracket is coupled to the frame of the cab.

20 Claims, 9 Drawing Sheets

(56) References Cited

U.S. PATENT DOCUMENTS

| | | | |
|---|---|---|---|
| 2015/0239510 A1* | 8/2015 | Davisdon | B62D 33/067 296/190.03 |
| 2015/0307140 A1* | 10/2015 | Scott | B62D 33/0604 296/190.07 |
| 2017/0225721 A1* | 8/2017 | Bumueller | B62D 33/0604 |

* cited by examiner

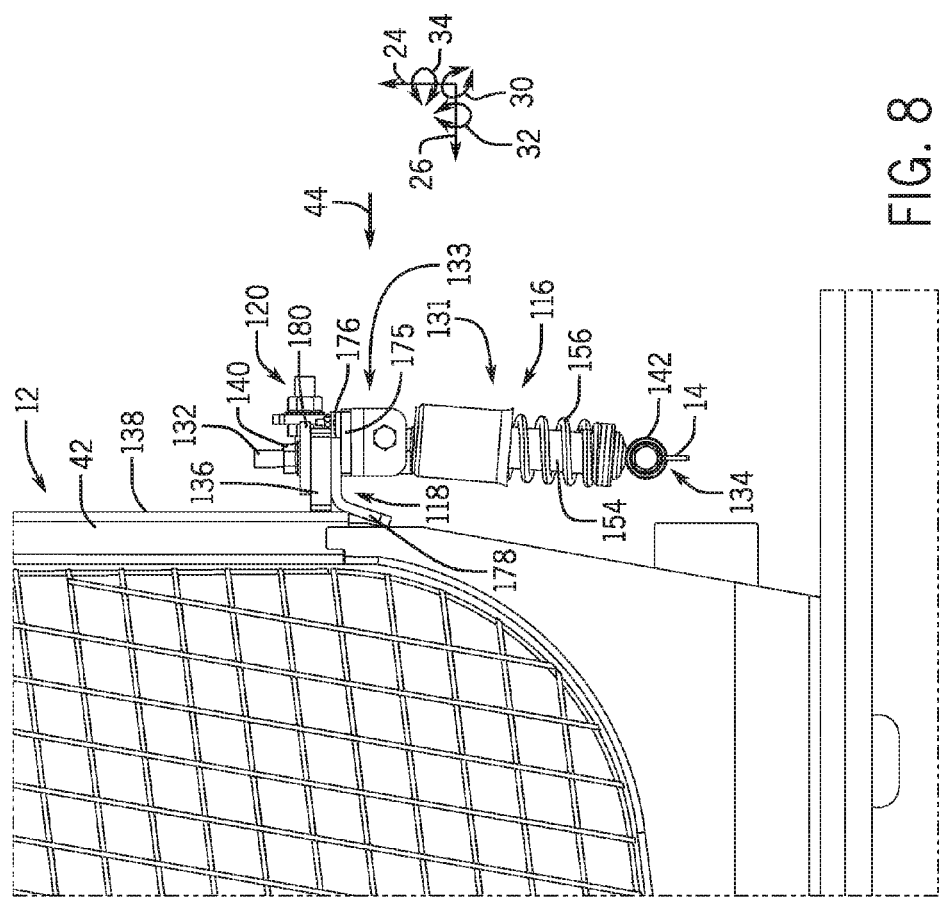

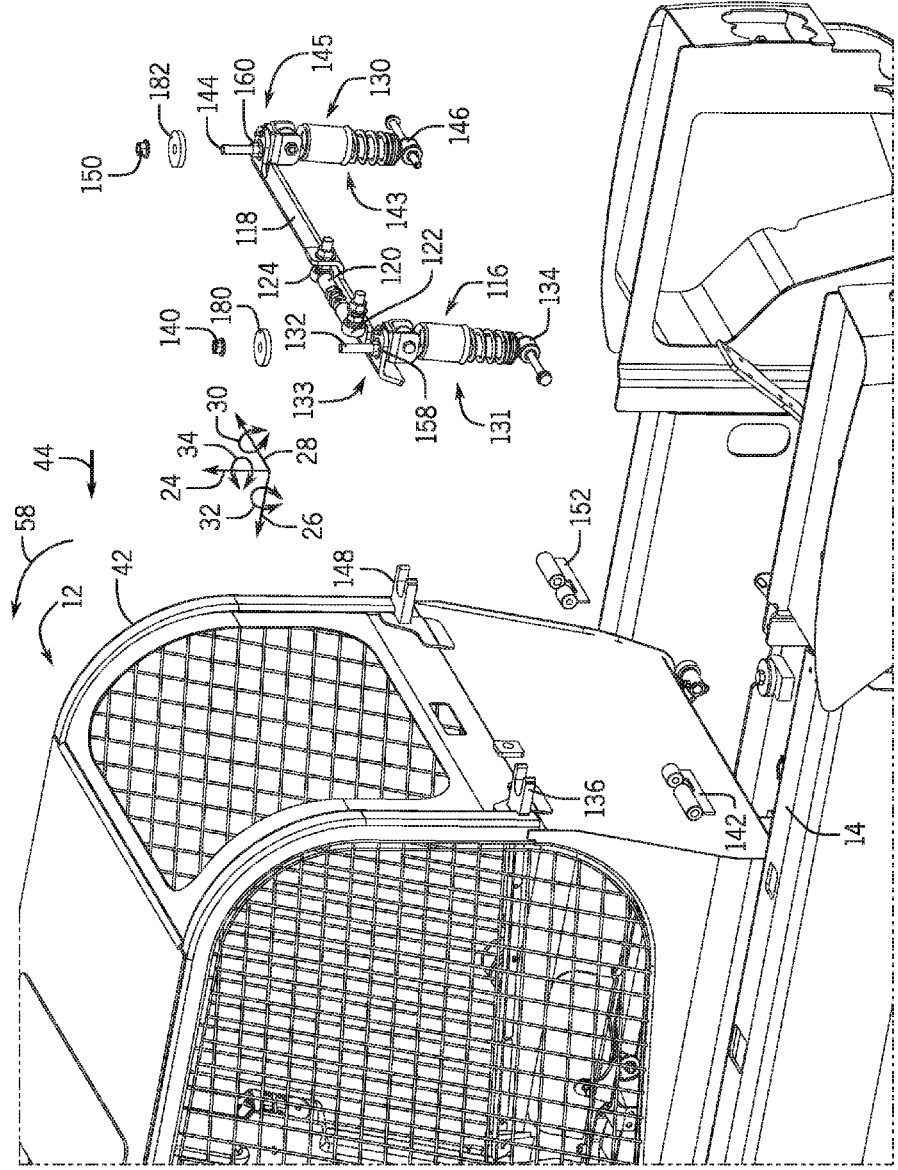

CAB SUSPENSION SYSTEM FOR A WORK VEHICLE

BACKGROUND

The present disclosure relates generally to a cab suspension system for a work vehicle.

Certain work vehicles (e.g., tractors, harvesters, skid steers, etc.) include a cab configured to house an operator. To facilitate access to certain components of the work vehicle (e.g., the engine, transmission, etc.), the cab may rotate forwardly relative to a chassis of the work vehicle about a pivot joint. In addition, the work vehicle may include certain elements to reduce the transmission of energy from the chassis to the cab. For example, the pivot joint may include a bushing (e.g., rubber bushing, polyurethane bushing, etc.) to reduce the transmission of energy to a front portion of the cab. In addition, an isolator (e.g., rubber isolator, polyurethane isolator, etc.) may be disposed between the cab and the chassis proximate to a rear portion of the cab to reduce the transmission of energy to the rear portion of the cab. However, due to the limited deformation of the bushing and the isolator, a significant portion of energy (e.g., associated with high-amplitude movement/vibrations experienced by the chassis) may be transmitted to the cab, thereby negatively affecting comfort of the operator.

BRIEF DESCRIPTION

In one embodiment, a cab suspension system for a work vehicle includes a front suspension assembly having at least one bracket configured to fixedly couple to a frame of a cab of the work vehicle. The at least one bracket is configured to extend forwardly from a front face of the frame relative to a direction of travel. In addition, the front suspension assembly includes a support element having a torsion bar and a pair of longitudinal supports. The torsion bar extends laterally between the pair of longitudinal supports, and each of the pair of longitudinal supports is configured to rotatably couple to a chassis of the work vehicle. The front suspension assembly also includes a damping assembly coupled to the support element and configured to couple to the chassis. The at least one bracket is rotatably coupled to the support element at a pivot joint assembly, and the at least one bracket is configured to position the pivot joint assembly forward of the cab relative to the direction of travel while the at least one bracket is coupled to the frame of the cab.

In another embodiment, a cab suspension system for a work vehicle includes a rear suspension assembly having a first shock absorber assembly and a second shock absorber assembly. Each of the first and second shock absorber assemblies has a first end configured to couple to a cab of the work vehicle and a second end configured to couple to a chassis of the work vehicle. The rear suspension assembly also includes a brace extending laterally between the first end of the first shock absorber assembly and the first end of the second shock absorber assembly relative to a direction of travel of the work vehicle. The first end of the first shock absorber assembly and the first end of the second shock absorber assembly are coupled to the brace. In addition, the rear suspension assembly includes a tie rod having a first end configured to rotatably couple to the chassis of the work vehicle and a second end rotatably coupled to the brace. The first end of the first shock absorber assembly and the first end of the second shock absorber assembly are configured to be decoupled from the cab without decoupling the brace from the first end of the first shock absorber assembly and the first end of the second shock absorber assembly.

In a further embodiment, a cab suspension system for a work vehicle includes a front suspension assembly having at least one bracket configured to fixedly couple to a frame of a cab of the work vehicle. The at least one bracket is configured to extend forwardly from a front face of the frame relative to a direction of travel. The front suspension assembly also includes a support element having a torsion bar and a pair of longitudinal supports. The torsion bar extends laterally between the pair of longitudinal supports, and each of the pair of longitudinal supports is configured to rotatably couple to a chassis of the work vehicle. In addition, the front suspension assembly includes a damping assembly coupled to the support element and configured to couple to the chassis. The at least one bracket is rotatably coupled to the support element at a pivot joint assembly, and the at least one bracket is configured to position the pivot joint assembly forward of the cab relative to the direction of travel while the at least one bracket is coupled to the frame of the cab. Furthermore, the cab suspension system includes a rear suspension assembly having a first rear shock absorber assembly and a second rear shock absorber assembly. Each of the first and second rear shock absorber assemblies has a first end configured to couple to the cab of the work vehicle and a second end configured to couple to the chassis of the work vehicle. The rear suspension assembly also includes a brace extending laterally between the first end of the first rear shock absorber assembly and the first end of the second rear shock absorber assembly relative to the direction of travel of the work vehicle. The first end of the first rear shock absorber assembly and the first end of the second rear shock absorber assembly are coupled to the brace. In addition, the rear suspension assembly includes a tie rod having a first end configured to rotatably couple to the chassis of the work vehicle and a second end rotatably coupled to the brace.

DRAWINGS

These and other features, aspects, and advantages of the present disclosure will become better understood when the following detailed description is read with reference to the accompanying drawings in which like characters represent like parts throughout the drawings, wherein:

FIG. 8 is a side view of the rear suspension assembly of FIG. 6; and

FIG. 9 is an exploded view of the rear suspension assembly of FIG. 6.

DETAILED DESCRIPTION

Figure 1:
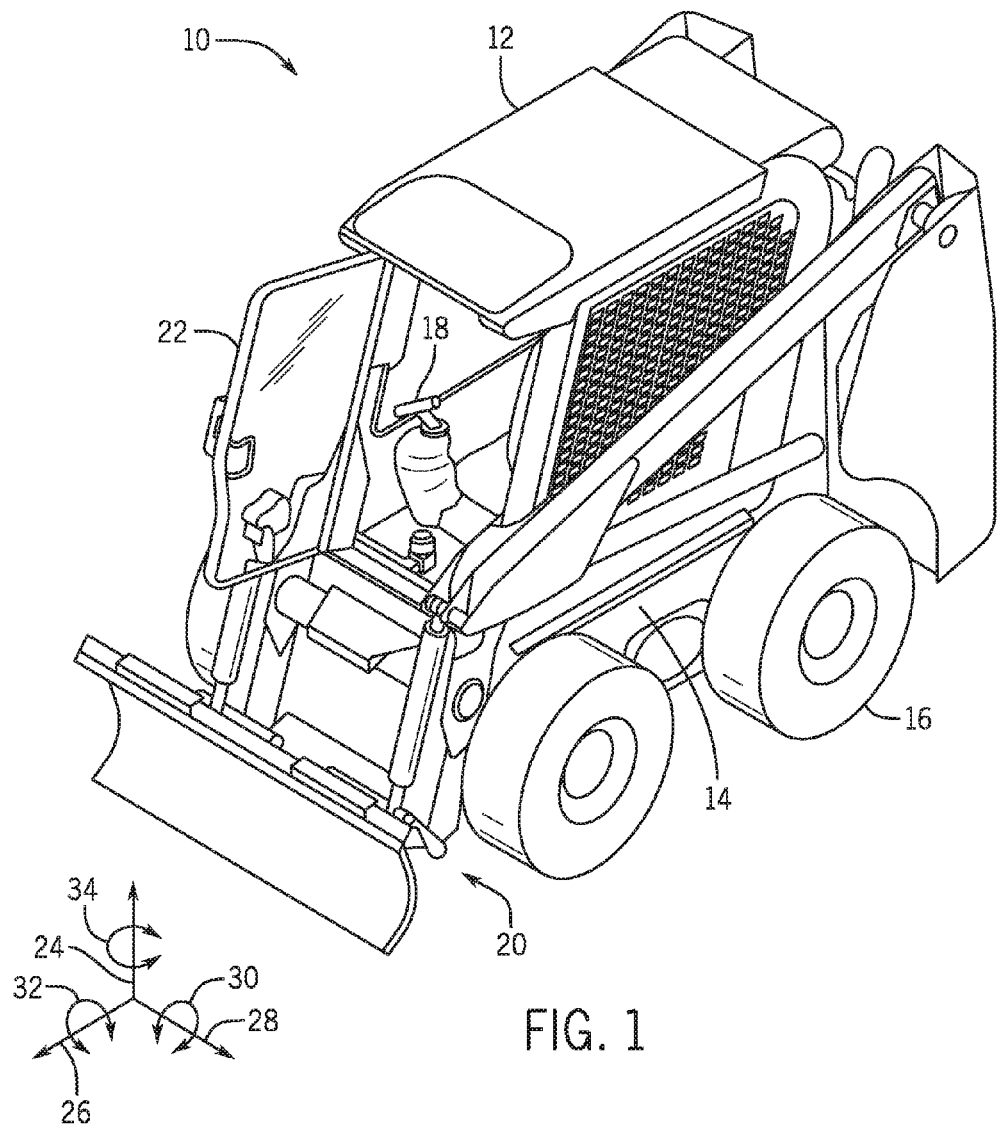
FIG. 1 is a perspective view of an embodiment of a work vehicle that may include a cab suspension system.

Turning to the drawings, FIG. 1 is a perspective view of an embodiment of a work vehicle 10 that may include a cab suspension system. In the illustrated embodiment, the work vehicle 10 is a skid steer. However, it should be appreciated that the cab suspension system disclosed herein may be utilized on other work vehicles, such as on-road trucks, tractors, harvesters, and construction equipment, among other work vehicles. In the illustrated embodiment, the work vehicle 10 includes a cab 12 and a chassis 14. In certain embodiments, the chassis 14 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 14 is configured to support the cab 12 and wheels 16. The wheels 16 may be driven to rotate by the motor and/or by component(s) of the hydraulic system (e.g., hydraulic motor(s), etc.). While the illustrated work vehicle 10 includes wheels 16, it should be appreciated that in alternative embodiments, the work vehicle may include tracks or a combination of wheels and tracks.

The cab 12 is configured to house an operator of the work vehicle 10. Accordingly, various controls, such as the illustrated joystick 18, are positioned within the cab 12 to facilitate operator control of the work vehicle 10. For example, the controls may enable the operator to control rotational speed of the wheels 16, thereby facilitating adjustment the speed and/or direction of the work vehicle 10. In addition, the controls may facilitate operator control of an implement, such as the illustrated blade 20. In the illustrated embodiment, the cab 12 also includes a door 22 to facilitate ingress and egress of the operator from the cab 12.

As discussed in detail below, the work vehicle 10 may include a cab suspension system configured to absorb energy (e.g., associated with movement/vibrations experienced by the chassis), thereby enhancing operator comfort. For example, the cab suspension system may enable the cab 12 to move relative to the chassis 14 along a vertical axis 24 of the work vehicle 10, while damping energy associated with the movement. In addition, the cab suspension system may be configured to substantially reduce movement of the cab 12 relative to the chassis 14 along a longitudinal axis 26 of the work vehicle 10 and along a lateral axis 28 of the work vehicle 10. The cab suspension system may also enable the cab 12 to rotate relative to the chassis 14 about the lateral axis 28 in pitch 30 and about the longitudinal axis 26 in roll 32. However, the cab suspension system may substantially reduce rotation of the cab 12 relative to the chassis 14 about the vertical axis 24 in yaw 34. Controlling movement of the cab 12 relative to the chassis 14 may enhance the comfort of the operator.

Figure 2:
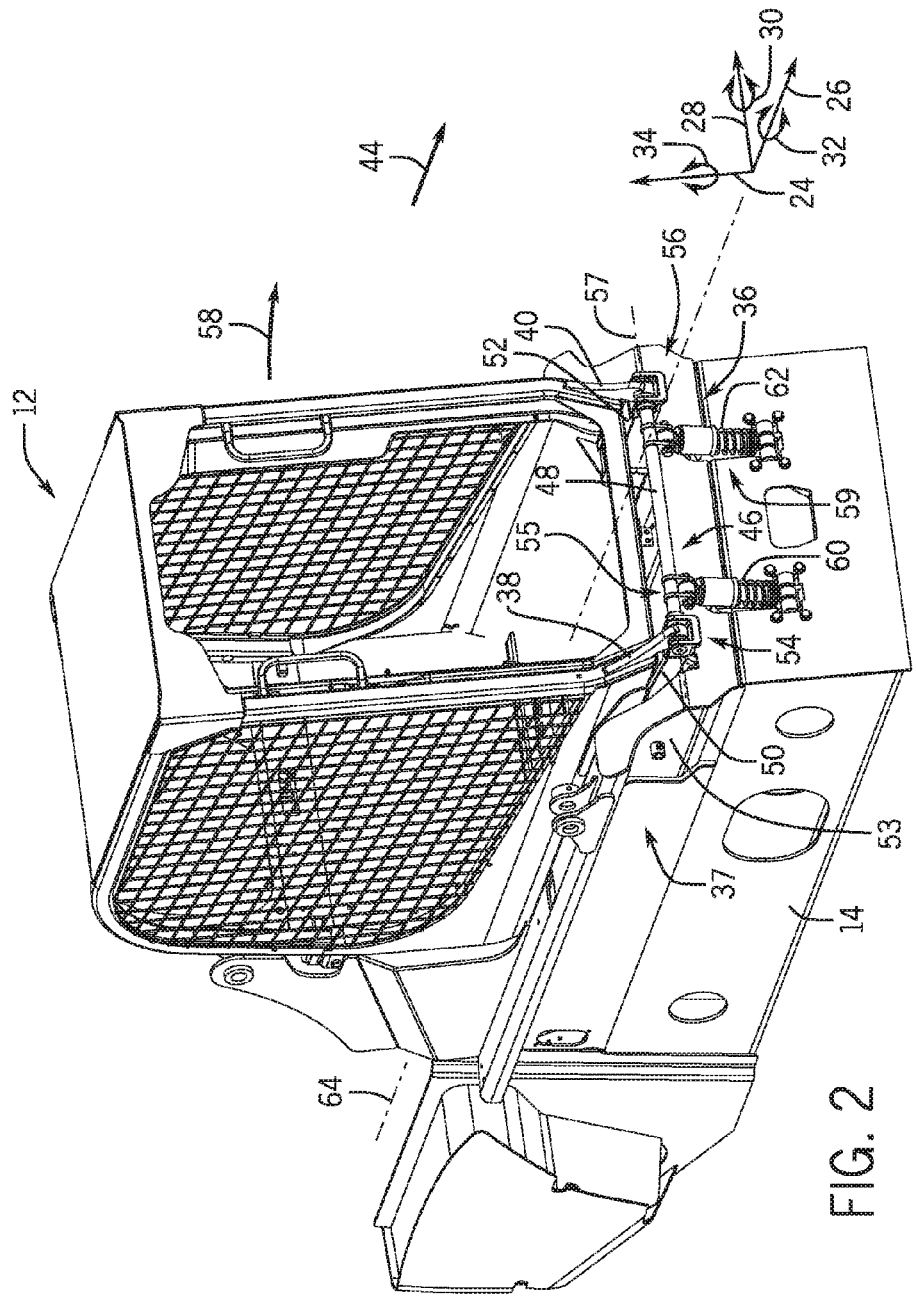
FIG. 2 is a perspective view of an embodiment of a front suspension assembly of a cab suspension system that may be employed within the work vehicle of FIG. 1.

FIG. 2 is a perspective view of an embodiment of a front suspension assembly 36 of a cab suspension system 37 that may be employed within the work vehicle of FIG. 1. In certain embodiments, the cab suspension system 37 includes a rear suspension assembly. However, it should be appreciated that the cab suspension system may include only a front suspension assembly, only a rear suspension assembly, or a combination of the front and rear suspension assemblies. In the illustrated embodiments, the front suspension assembly 36 includes a first bracket 38 and a second bracket 40. Each bracket is fixedly coupled to a frame 42 of the cab 12 (e.g., via a welded connection, via an adhesive connection, via fasteners, etc.). As discussed in detail below, each bracket extends forwardly from a front face of the frame 42 relative to a direction of travel 44 of the work vehicle (e.g., along the longitudinal axis 26). While the illustrated front suspension assembly 36 includes two brackets, it should be appreciated that in alternative embodiments, the front suspension assembly may include more or fewer brackets (e.g., 1, 2, 3, 4, 5, 6, or more).

In the illustrated embodiment, the front suspension assembly 36 also includes a support element 46 having a torsion bar 48 and a pair of longitudinal supports, such as the illustrated first longitudinal support 50 and the second longitudinal support 52. As illustrated, the torsion bar 48 extends between the pair of longitudinal supports substantially along the lateral axis 28. The first longitudinal support 50 and the second longitudinal support 52 are each rotatably coupled to the chassis 14 of the work vehicle. In the illustrated embodiment, each of the longitudinal supports is positioned laterally inward from a laterally outward surface 53 of the chassis 14. Accordingly, the longitudinal supports may be separated from other moving parts of the work vehicle and/or a compact front suspension assembly may be formed. However, it should be appreciated that in alternative embodiments, at least one of the longitudinal supports may be positioned laterally outward from the outer surface of the chassis.

In the illustrated embodiment, the first bracket 38 is rotatably coupled to the support element 46 at a first pivot joint 54 of a pivot joint assembly 55, and the second bracket 40 is rotatably coupled to the support element 46 at a second pivot joint 56 of the pivot joint assembly 55. The brackets enable the pivot joints to be positioned forward of the cab 12 relative to the direction of travel 44, thereby enabling the cab to be tilted forwardly about a rotation axis 57 in the direction 58 from the illustrated working position to a maintenance position that facilitates access to components housed within the chassis, such as the motor (e.g., diesel engine, etc.), the hydraulic system (e.g., including a pump, valves, reservoir, etc.), and other components (e.g., an electrical system, a cooling system, etc.). While the illustrated pivot joint assembly includes two pivot joints, it should be appreciated that alternative embodiments may include more or fewer pivot joints (e.g., corresponding to the number of brackets coupled to the chassis).

Because the pivot joints position the rotation axis 57 forward of the cab 12 relative to the direction of travel 44, the cab 12 may be pivoted farther in the direction 58 than a cab configured to rotate about a rotation axis that is positioned underneath the cab (e.g., below the cab and within the longitudinal extent of the cab), thereby increasing access to the components housed within the chassis. Furthermore, positioning the pivot joints forward of the cab 12 relative to the direction of travel 44 enables the height of the work vehicle to be reduced, as compared to a work vehicle having a cab configured to pivot about a rotation axis that is positioned underneath the cab (e.g., below the cab and within the longitudinal extent of the cab). In addition, positioning the pivot joints forward of the cab 12 may enable the size of the operator foot well to be increased, as compared to positioning the pivot joints underneath the cab (e.g., in a location that is otherwise occupied by the foot well), thereby enhancing occupant comfort.

Furthermore, the front suspension assembly 36 includes a damping assembly 59 having a front right (e.g., first) shock absorber 60 and a front left (e.g., second) shock absorber 62. In the illustrated embodiment, the front right shock absorber 60 is on an opposite side of a longitudinal centerline 64 of the work vehicle from the front left shock absorber 62. However, it should be appreciated that in alternative embodiments, the shock absorbers may be positioned at other locations on the support element. Furthermore, while the illustrated damping assembly includes two shock absorbers, it should be appreciated that in alternative embodiments, the damping assembly may include more or fewer shock absorbers.

In the illustrated embodiment, each shock absorber is coupled to the support element 46 and to the chassis 14. The shock absorbers are configured to absorb energy (e.g., associated with movement/vibrations experienced by the chassis 14), thereby reducing the transmission of energy from the chassis to the cab. For example, the shock absorbers may reduce energy transfer along the vertical axis 24, about the longitudinal axis 26 in roll 32, about the lateral axis 28 in pitch 30, or a combination thereof. In addition, the support element 46 may substantially reduce movement of the cab relative to the chassis along the longitudinal 26, along the lateral axis 28, about the vertical axis 24 in yaw 34, or a combination thereof. As a result of the shock absorbers and the support element, the front suspension assembly may significantly increase operator comfort, as compared to work vehicles that only include a bushing at the pivot joint(s) to reduce energy transfer. In addition, combining the front suspension assembly with the pivot joints may reduce the cost, complexity, size, or a combination thereof, of the work vehicle (e.g., as compared to a work vehicle that includes a separate front suspension assembly and pivot joint(s)).

Figure 3:
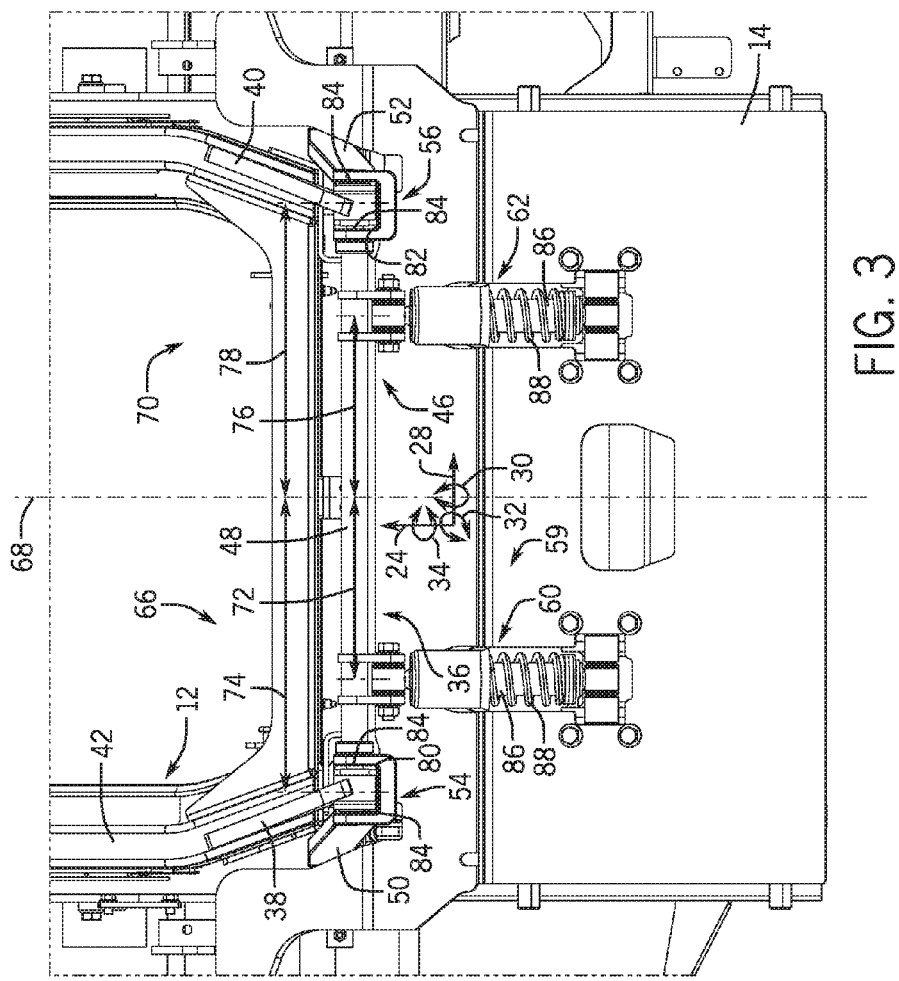
FIG. 3 is a front view of the front suspension assembly of FIG. 2.

FIG. 3 is a front view of the front suspension assembly 36 of FIG. 2. As illustrated, the first bracket 38 is positioned on a first lateral side 66 of a vertical centerline 68 of the work vehicle, and the second bracket 40 is positioned on a second lateral side 70 of the vertical centerline 68, opposite the first lateral side 66. As previously discussed, the first bracket 38 is rotatably coupled to the support element 46 at the first pivot joint 54, and the second bracket 40 is rotatably coupled to the support element 46 at the second pivot joint 56. The front right shock absorber 60 is positioned closer to the vertical centerline 68 than the first pivot joint 54. Accordingly, a first lateral distance 72 (e.g., distance along the lateral axis 28) between the front right shock absorber 60 and the vertical centerline 68 is less than a second lateral distance 74 (e.g., distance along the lateral axis 28) between the first pivot joint 54 and the vertical centerline 68. In addition, the front left shock absorber 62 is positioned closer to the vertical centerline 68 than the second pivot joint 56. Accordingly, a third lateral distance 76 (e.g., distance along the lateral axis 28) between the front left shock absorber 62 and the vertical centerline 68 is less than a fourth lateral distance 78 (e.g., distance along the lateral axis 28) between the second pivot joint 56 and the vertical centerline 68. As a result of this configuration, the pivot joints and brackets are positioned laterally outward from the shock absorbers relative to the vertical centerline 68, thereby increasing stability of the cab during rotation about the pivot joints between the working position and the maintenance position.

In the illustrated embodiment, the support element includes a first recess 80 configured to receive the first bracket 38 and a second recess 82 configured to receive the second bracket 40. The first pivot joint 54 is formed within the first recess 80, and the second pivot joint 56 is formed within the second recess 82. Contact between each bracket and lateral side walls 84 of the respective recess (e.g., via bushing(s) and/or bearing(s) coupled to the bracket and/or the support element) may substantially reduce movement of the cab relative to the support element along the lateral axis 28, thereby increasing the stability of the cab during rotation about the pivot joints and/or during operation of the work vehicle. While the pivot joints are formed within the respective recesses in the illustrated embodiment, it should be appreciated that in alternative embodiments, the pivot joints may be formed on other portions of the support element (e.g., on the torsion bar, etc.). Furthermore, while the support element includes two recesses in the illustrated embodiment, it should be appreciated that in alternative embodiments, the support element may include more or fewer recesses (e.g., corresponding to the number of brackets extending from the frame of the cab).

In the illustrated embodiment, each shock absorber includes a damper 86 (e.g., a viscous/hydraulic damper, an eddy current damper, etc.) and a spring 88. The combination of the damper 86 and the spring 88 is configured to absorb energy (e.g., associated with vibration/movement experienced by the chassis), thereby reducing the transmission of energy from the chassis to the cab. While each shock absorber includes a damper and a spring in the illustrated embodiment, it should be appreciated that in alternative embodiments, at least one shock absorber may only include a spring or a damper. In addition, in certain embodiments, each shock absorber may include another device (e.g., alone or in combination with other device(s), such as the spring and/or damper) configured to absorb energy (e.g., associated with vibration/movement experienced by the chassis). For example, at least one shock absorber may include a hydraulic piston, an air bag, a pneumatic piston, or a combination thereof, among other shock absorbing devices. In certain embodiments, the energy absorbing characteristics of each shock absorber (e.g., compression/extension of the shock absorber under load, etc.) may be adjusted by controlling the fluid pressure within the shock absorbing device(s) (e.g., hydraulic cylinder, air bag, pneumatic piston, etc.) to achieve the desired operator comfort. In certain embodiments, at least one shock absorber may include internal stop(s) configured to limit the compression and/or expansion of the shock absorber, thereby controlling movement of the cab relative to the chassis. The internal stop(s) may be adjustable based on a desired magnitude of compression and/or expansion of the shock absorber.

Figure 4:
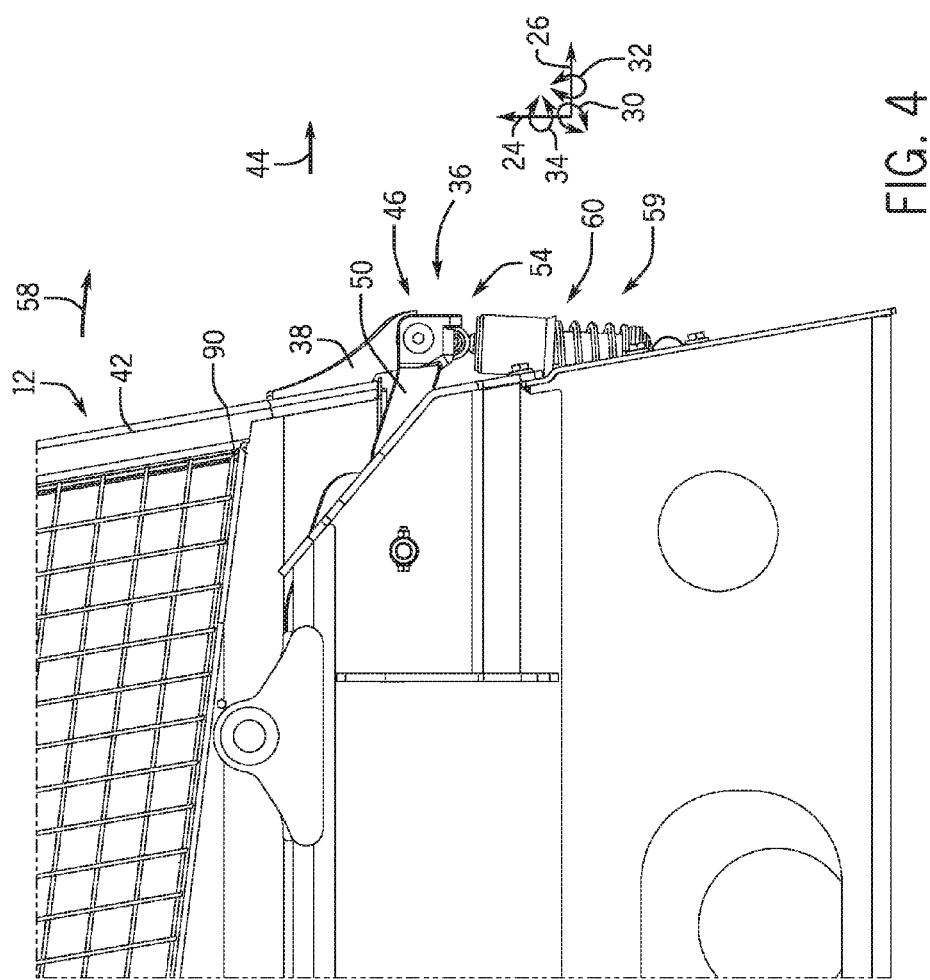
FIG. 4 is a side view of the front suspension assembly of FIG. 2.

FIG. 4 is a side view of the front suspension assembly 36 of FIG. 2. As illustrated, the first bracket 38 extends forwardly from a front face 90 of the frame 42 of the cab 12 relative to the direction of travel 44. Accordingly, the first bracket 38 is positioned forward of the front face 90 of the frame 42 along the longitudinal axis 26 in the direction of travel 44. In the illustrated embodiment, the front face 90 of the frame 42 extends substantially along the vertical axis 24 and substantially along the lateral axis of the work vehicle. As previously discussed, the first bracket 38 may be coupled to the front face 90 of the frame 42 by a welded connection, an adhesive connection, fasteners, or a combination thereof, among other connections.

Furthermore, the second bracket also extends forwardly from the front face of the frame of the cab relative to the direction of travel (e.g., the first bracket extends from a front face of a first vertical support of the frame, and the second bracket extends from a front face of a second vertical support of the frame). Positioning the brackets forward of the front face of the frame enables the pivot joints to be positioned forward of the cab relative to the direction of travel, thereby enabling the cab to be tilted farther in the direction 58 than a cab configured to rotate about pivot joints that are positioned underneath the cab (e.g., below the cab and within the longitudinal extent of the cab).

Figure 5:
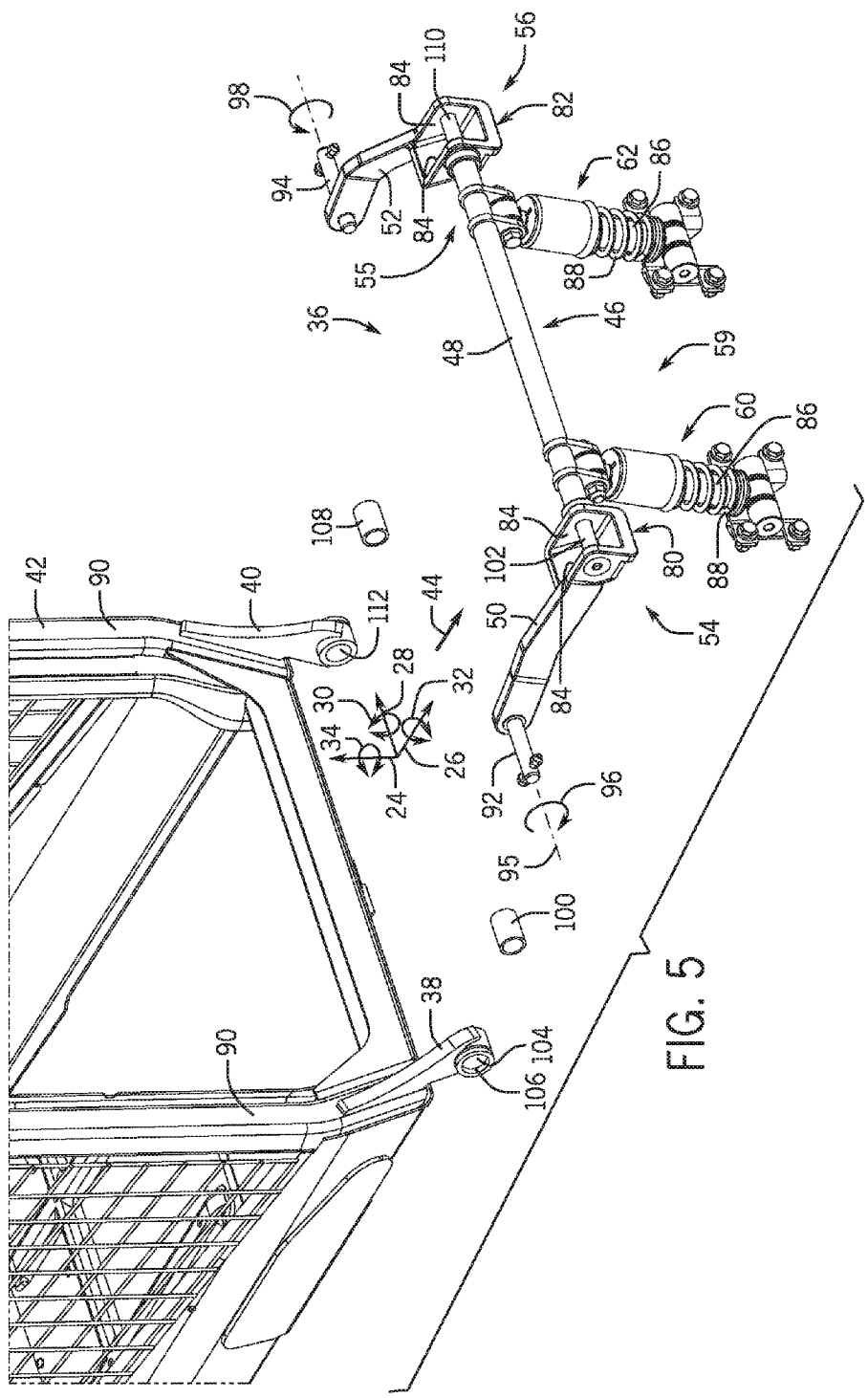
FIG. 5 is an exploded view of the front suspension assembly of FIG. 2.

FIG. 5 is an exploded view of the front suspension assembly 36 of FIG. 2. In the illustrated embodiment, the first longitudinal support 50 is rotatably coupled to the chassis of the work vehicle by a first axle 92, and the second longitudinal support 52 is rotatably coupled to the chassis of the work vehicle by a second axle 94. The axles enable the support element 46 to rotate about a rotation axis 95 (e.g., parallel to the lateral axis 28) relative to the chassis. The shock absorbers are configured to absorb rotational energy associated with movement/vibrations of the support element 46 about the rotation axis 95. For example, when the work vehicle (e.g., at least one front wheel of the work vehicle) encounters a protrusion on the ground (e.g., bump, ridge, etc.), the front of the cab may be urged downwardly relative to the chassis, thereby inducing the support element 46 to rotate about the rotation axis 95 in a downward direction 96. As the support element 46 rotates in the downward direction 96, the shock absorbers may compress and absorb energy. As a result, the energy transfer between the chassis and the cab may be reduced, thereby enhancing passenger comfort. In addition, when the work vehicle (e.g., at least one front wheel of the work vehicle) encounters a recess in the ground (e.g., trench, divot, etc.), the front of the cab may be urged upwardly relative to the chassis, thereby inducing the support element 46 to rotate about the rotation axis 95 in an upward direction 98. As the support element 46 rotates in the upward direction 98, the shock absorbers may expand and absorb energy. As a result, the energy transfer between the chassis and the cab may be reduced, thereby enhancing passenger comfort. The shock absorbers may also dissipate energy associated with the roll 32 and/or pitch 30 movement of the cab, thereby further enhancing passenger comfort.

As previously discussed, the brackets are coupled to the support element 46 by pivot joints. In the illustrated embodiment, the first pivot joint 54 includes a bushing 100. The bushing 100 is disposed about a shaft 102 of the support element 46, and the bushing 100 is disposed within an opening 104 of the first bracket 38. Accordingly, the bushing 100 is disposed between the first bracket 38 and the support element 46. The bushing 100 is formed from a resilient material (e.g., rubber, polyurethane, etc.) and is configured to absorb energy associated with movement (e.g., vibration) of the chassis, thereby reducing energy transfer from the chassis to the cab. In the illustrated embodiment, the first pivot joint 54 includes a bearing 106 disposed about the shaft 102 and configured to facilitate rotation of the cab about the first pivot joint 54.

Similar to the first pivot joint 54, the second pivot joint 56 includes a bushing 108 disposed about a shaft 110 of the support element 46. In addition, the bushing 108 is disposed within an opening 112 of the second bracket 40. Accordingly, the bushing 108 is disposed between the second bracket 40 and the support element 46. The bushing 108 is also formed from a resilient material (e.g., rubber, polyurethane, etc.) and is configured to absorb energy associated with movement (e.g., vibration) of the chassis, thereby reducing energy transfer from the chassis to the cab. While each pivot joint includes a bushing in the illustrated embodiment, it should be appreciated that in alternative embodiments, at least one of the bushings may be omitted and/or at least one of the bushings may be formed from a substantially rigid material.

Figure 6:
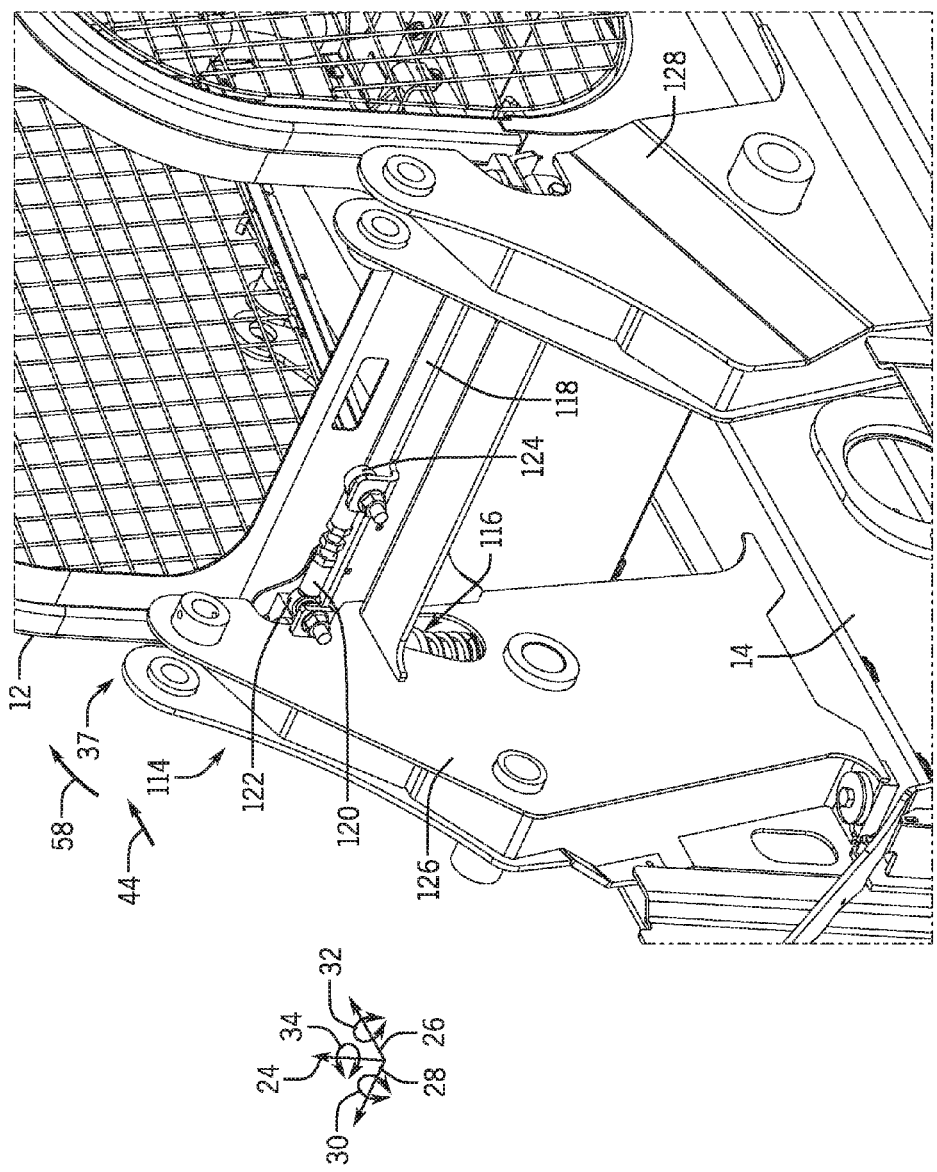
FIG. 6 is a perspective view of an embodiment of a rear suspension assembly of a cab suspension system that may be employed within the work vehicle of FIG. 1.

FIG. 6 is a perspective view of an embodiment of a rear suspension assembly 114 of a cab suspension system 37 that may be employed within the work vehicle of FIG. 1. As discussed in detail below, the rear suspension assembly 114 includes a rear left (e.g., first) shock absorber assembly 116 and a rear right (e.g., second) shock absorber assembly. Each shock absorber assembly has a top (e.g., first) end configured to be coupled to the cab 12 of the work vehicle and a bottom (e.g., second) end coupled to the chassis 14 of the work vehicle. In addition, the rear suspension assembly 114 includes a brace 118 extending along the lateral axis 28 (e.g., lateral relative to the direction of travel 44) between the top end of the rear left shock absorber assembly 116 and the top end of the rear right shock absorber assembly. In addition, the rear suspension assembly 114 includes a tie rod 120 having a first end 122 rotatably coupled to the chassis 14 and a second end 124 rotatably coupled to the brace 118. The top end of the rear left shock absorber assembly 116 and the top end of the rear right shock absorber assembly are configured to be decoupled from the cab 12 without decoupling the brace 118 from the top end of the rear left shock absorber assembly 116 and the top end of the rear right shock absorber assembly. Accordingly, the cab 12 may be decoupled from the rear suspension assembly 114 via removal of two fasteners that secure the cab 12 to the top ends of the respective shock absorber assemblies, thereby facilitating rotation of the cab 12 in the direction 58 from the illustrated working position to the maintenance position.

In the illustrated embodiment, the rear left shock absorber assembly 116 is disposed within a first tower support 126 of the chassis 14, and the rear right shock absorber assembly is disposed within a second tower support 128 of the chassis 14. Disposing the shock absorber assemblies within the respective tower supports may shield the shock absorber assemblies from the environment surrounding the work vehicle and/or substantially reduce or eliminate the possibility of interference between the shock absorber assemblies and a moving component of the work vehicle. However, it should be appreciated that in alternative embodiments, the shock absorber assemblies may be positioned in any suitable location on the work vehicle. In addition, while the rear suspension assembly 114 includes two shock absorber assemblies in the illustrated embodiment, it should be appreciated that in alternative embodiments, the rear suspension assembly may include more or fewer shock absorber assemblies (e.g., 1, 2, 3, 4, 5, 6, or more).

Figure 7:
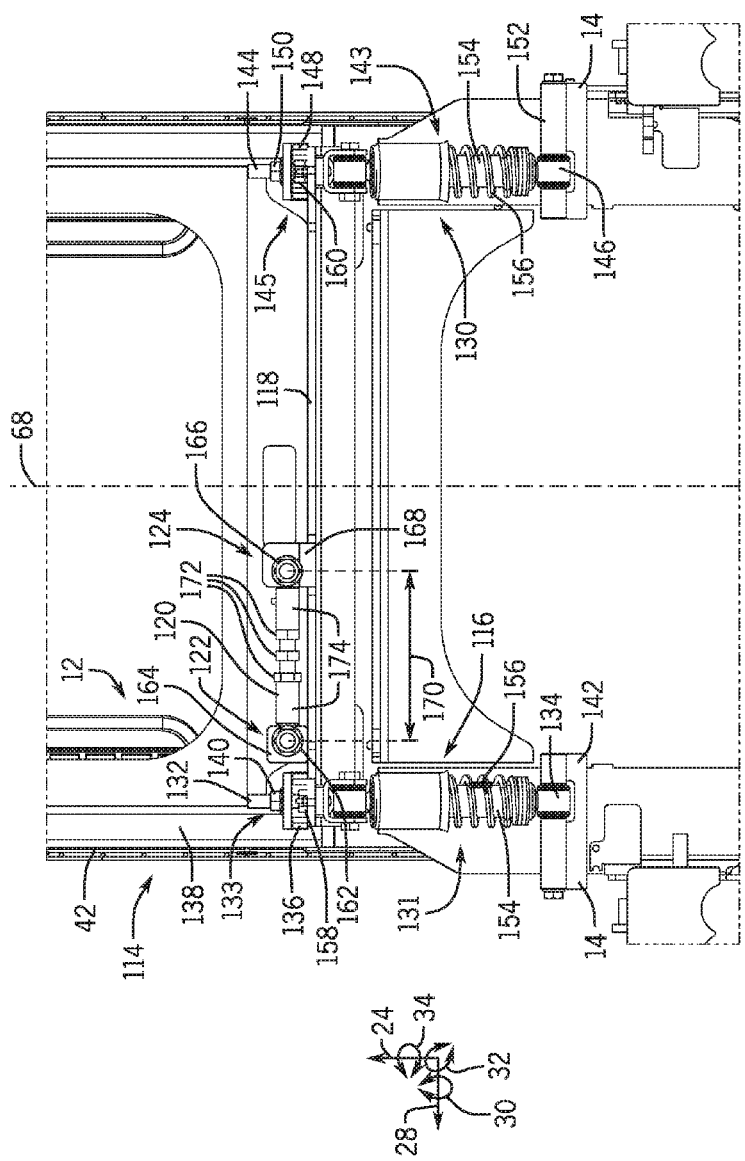
FIG. 7 is a rear view of the rear suspension assembly of FIG. 6.

FIG. 7 is a rear view of the rear suspension assembly 114 of FIG. 6. As previously discussed, the rear suspension assembly 114 includes the rear left shock absorber assembly 116 and the rear right shock absorber assembly 130. In the illustrated embodiment, the rear left shock absorber assembly 116 includes a shock absorber 131 and a mounting assembly 133. The shock absorber 131 is configured to absorb energy (e.g., associated with vibration/movement experienced by the chassis), and the mounting assembly 133 is configured to selectively secure the shock absorber 131 to the cab 12. A top (e.g., first) end 132 of the rear left shock absorber assembly 116 (e.g., a top end of the mounting assembly) is configured to couple to the cab 12, and a bottom (e.g., second) end 134 of the rear left shock absorber assembly 116 (e.g., a bottom end of the shock absorber) is coupled to the chassis 14. In the illustrated embodiment, the top end 132 of the rear left shock absorber assembly 116 is selectively coupled to a first mount 136 extending from a rear face 138 of the frame 42 of the cab 12 by a first fastener 140. In certain embodiments, the top end 132 of the rear left shock absorber assembly 116 (e.g., the top end of the mounting assembly) is threaded, and the first fastener 140 is configured to engage the threads of the top end 132 to couple the rear left shock absorber assembly 116 to the cab 12. However, it should be appreciated that in alternative embodiments, the top end of the rear left shock absorber assembly may be selectively coupled to the cab by other fastening systems (e.g., a latch, a magnetic coupling, etc.). Furthermore, the bottom end 134 of the rear left shock absorber assembly 116 (e.g., the bottom end of the shock absorber) is pivotally coupled to a first support 142 of the chassis 14. The first support 142 may extend across the first tower support to secure the bottom end of the rear left shock absorber assembly to the chassis 14.

Furthermore, the rear right shock absorber assembly 130 includes a shock absorber 143 and a mounting assembly 145. The shock absorber 143 is configured to absorb energy (e.g., associated with vibration/movement experienced by the chassis), and the mounting assembly 145 is configured to selectively secure the shock absorber 143 to the cab 12. A top (e.g., first) end 144 of the rear right shock absorber assembly 130 (e.g., a top end of the mounting assembly) is configured to couple to the cab 12, and a bottom (e.g., second) end 146 of the rear right shock absorber assembly 130 (e.g., a bottom end of the shock absorber) is coupled to the chassis 14. In the illustrated embodiment, the top end 144 of the rear right shock absorber assembly 130 is selectively coupled to a second mount 148 extending from the rear face 138 of the frame 42 of the cab 12 by a second fastener 150. In certain embodiments, the top end 144 of the rear right shock absorber assembly 130 (e.g., the top end of the mounting assembly) is threaded, and the second fastener 150 is configured to engage the threads of the top end 144 to couple the rear right shock absorber assembly 130 to the cab 12. However, it should be appreciated that in alternative embodiments, the top end of the rear right shock absorber assembly may be selectively coupled to the cab by other fastening systems (e.g., a latch, a magnetic coupling, etc.). Furthermore, the bottom end 146 of the rear right shock absorber assembly 130 (e.g., the bottom end of the shock absorber) is pivotally coupled to a second support 152 of the chassis 14. The second support 152 may extend across the second tower support to secure the bottom end of the rear right shock absorber assembly to the chassis 14.

In the illustrated embodiment, the shock absorber of each shock absorber assembly includes a damper 154 (e.g., a viscous/hydraulic damper, an eddy current damper, etc.) and a spring 156. The combination of the damper 154 and the spring 156 is configured to absorb energy (e.g., associated with vibration/movement experienced by the chassis), thereby reducing the transmission of energy from the chassis to the cab. While each shock absorber includes a damper and a spring in the illustrated embodiment, it should be appreciated that in alternative embodiments, at least one shock absorber may only include a spring or a damper. In addition, in certain embodiments, each shock absorber may include another device (e.g., alone or in combination with other device(s), such as the spring and/or damper) configured to absorb energy (e.g., associated with vibration/movement experienced by the chassis). For example, at least one shock absorber may include a hydraulic piston, an air bag, a pneumatic piston, or a combination thereof, among other shock absorbing devices. In certain embodiments, the energy absorbing characteristics of each shock absorber (e.g., compression/extension of the shock absorber under load, etc.) may be adjusted by controlling the fluid pressure within the shock absorbing device(s) (e.g., hydraulic cylinder, air bag, pneumatic piston, etc.) to achieve the desired operator comfort. In certain embodiments, at least one shock absorber may include internal stop(s) configured to limit the compression and/or expansion of the shock absorber, thereby controlling movement of the cab relative to the chassis. The internal stop(s) may be adjustable based on a desired magnitude of compression and/or expansion of the shock absorber.

As illustrated, the brace 118 extends along the lateral axis 28 between the top end 132 of the rear left shock absorber assembly 116 and the top end 144 of the rear right shock absorber assembly 130. The top end 132 of the rear left shock absorber assembly 116 (e.g., the top end of the mounting assembly) is coupled to the brace 118 by a third fastener 158, and the top end 144 of the rear right shock absorber assembly 130 (e.g., the top end of the mounting assembly) is coupled to the brace 118 by a fourth fastener 160. In certain embodiments, the top end of each shock absorber assembly is threaded, and the third and fourth fasteners are each configured to engage the threads of the respective top end to couple the respective shock absorber assembly to the brace. However, it should be appreciated that in alternative embodiments, the top end of each shock absorber assembly may be coupled to the brace by other fastening systems (e.g., a welded connection, an adhesive connection, etc.).

Furthermore, the tie rod 120 extends between the chassis 14 and the brace 118. As illustrated, the first end 122 of the tie rod 120 is rotatably coupled to the chassis 14, and the second end 124 of the tie rod 120 is rotatably coupled to the brace 118. In the illustrated embodiment, the first end 122 of the tie rod 120 is coupled via a fastener 162 to a mount 164 that extends from the first tower support of the chassis 14. However, in alternative embodiments, the first end of the tie rod may be coupled to other portions of the chassis, and/or the first end of the tie rod may be coupled to the chassis by other connection systems (e.g., a pin, etc.). Furthermore, the second end 124 of the tie rod 120 is coupled via a fastener 166 to a tab 168 that extends from the brace 118. However, in alternative embodiments, the second end of the tie rod may be coupled to other portions of the brace, and/or the second end of the tie rod may be coupled to the brace by other connection systems (e.g., a pin, etc.). In the illustrated embodiment, a length 170 of the tie rod 120 is adjustable via rotation of fasteners 172 that coupe segments 174 of the tie rod 120 to one another. However, in alternative embodiments, the length of the tie rod may be fixed (e.g., the tie rod may include a single segment).

In the illustrated embodiment, the tie rod 120 is positioned closer to the vertical centerline 68 than the rear left shock absorber assembly 116 along the lateral axis 28, and the tie rod 120 is positioned closer to the vertical centerline 68 than the rear right shock absorber assembly 130 along the lateral axis 28. Accordingly, the tie rod 120 is positioned laterally inward from the rear left shock absorber assembly 116 and from the rear right shock absorber assembly 130. Accordingly, the rear suspension assembly 114 may be more compact than a suspension system that includes a tie rod that extends laterally outward beyond the rear left shock absorber assembly and/or the rear right shock absorber assembly. Furthermore, in the illustrated embodiment, the second end 124 of the tie rod 120 (i.e., the end coupled to the brace 118) is positioned closer to the vertical centerline 68 than the first end 122 (i.e., the end coupled to the chassis) along the lateral axis 28. Accordingly, the second end 124 of the tie rod 120 is positioned laterally inward from the first end 122. However, it should be appreciated that in alternative embodiments, the first end of the tie rod may be positioned laterally inward from the second end.

The tie rod 120 is configured to substantially reduce movement of the cab 12 relative to the chassis 14 along the lateral axis 28 and along the longitudinal axis. In addition, the tie rod 120 is configured to substantially reduce rotation of the cab 12 about the vertical axis 24 in yaw 34. The tie rod 120 may enable movement of the cab 12 along the vertical axis 24, rotation of the cab 12 about the longitudinal axis in roll 32, and rotation of the cab 12 about the lateral axis 28 in pitch 30. The shock absorbers of the shock absorber assemblies may reduce energy transfer between the chassis and the cab along the vertical axis 24, about the longitudinal axis 26 in roll 32, about the lateral axis 28 in pitch 30, or a combination thereof. As a result of the arrangement of the shock absorber assemblies, the brace, and the tie rod, the rear suspension assembly may significantly increase operator comfort, as compared to work vehicles that only include a resilient isolator at the rear connection between the cab and the chassis.

As previously discussed, the top end 132 of the rear left shock absorber assembly 116 and the top end 144 of the rear right shock absorber assembly 130 are configured to be decoupled from the cab 12 without decoupling the brace 118 from the top end 132 of the rear left shock absorber assembly 116 and the top end 144 of the rear right shock absorber assembly 130. To decouple the rear end of the cab 12 from the chassis 14, the first fastener 140 may be removed from the top end 132 of the rear left shock absorber assembly 116, and the second fastener 150 may be removed from the top end 144 of the rear right shock absorber assembly 130. Removing the first and second fasteners enables the cab to be rotated forwardly about the pivot joints, thereby facilitating access to components housed within the chassis. However, because the third fastener 158 remains coupled to the top end 132 of the rear left shock absorber assembly 116, and the fourth fastener 160 remains coupled to the top end 144 of the rear right shock absorber assembly 130, the brace 118 remains coupled to the top end 132 of the rear left shock absorber assembly 116 and to the top end 144 of the rear right shock absorber assembly 130. Accordingly, the shock absorber assemblies, the brace, and the tie rod remain coupled to the chassis while the cab is rotated toward the maintenance position.

FIG. 8 is a side view of the rear suspension assembly 114 of FIG. 6. As illustrated, the first mount 136 extends rearwardly from the rear face 138 of the frame 42 of the cab 12 relative to the direction of travel 44. The second mount also extends rearwardly from the rear face of the frame of the cab relative to the direction of travel. In the illustrated embodiment, the brace 118 is disposed between the first mount 136 and a mounting portion 175 (e.g., a bracket of the mounting assembly, a spacer disposed on a bracket of the mounting assembly, etc.) of the rear left shock absorber assembly 116. In addition, the brace is disposed between the second mount and a mounting portion (e.g., a bracket of the mounting assembly, a spacer disposed on a bracket of the mounting assembly, etc.) of the rear right shock absorber assembly. As previously discussed, the brace 118 is coupled to each shock absorber assembly by a respective fastener. In the illustrated embodiment, the brace 118 includes a first portion 176 disposed between the mounts and the mounting portions of the respective shock absorber assemblies, and a second portion 178 positioned forward of the first portion 176 along the longitudinal axis 26 relative to the direction of travel 44. The second portion 178 of the brace 118 is configured to contact the frame 42 of the cab 12 to facilitate alignment of the mounts with the top ends of the respective shock absorber assemblies (e.g., while the cab is in the working position).

As previously discussed, the top end 132 (e.g., the top end of the mounting assembly) of the rear left shock absorber assembly 116 is selectively coupled to the first mount 136 by the first fastener 140, and the top end (e.g., the top end of the mounting assembly) of the rear right shock absorber assembly is selectively coupled to the second mount by the second fastener. In the illustrated embodiment, a first washer 180 is disposed between the first fastener 140 and the first mount 136. In addition, a second washer is disposed between the second fastener and the second mount. The washers are configured to distribute the force applied by the fasteners across a larger area of the respective mounts. While the illustrated embodiment includes washers disposed between the fasteners and the mounts, it should be appreciated that in alternative embodiments, at least one of the washers may be omitted.

FIG. 9 is an exploded view of the rear suspension assembly 114 of FIG. 6. In the illustrated embodiment, the top end 132 (e.g., the top end of the mounting assembly) of the rear left shock absorber assembly 116 is selectively coupled to the first mount 136 of the cab 12 via the washer 180 and the first fastener 140. In addition, the bottom end 134 (e.g., the bottom end of the shock absorber) of the rear left shock absorber assembly 116 is coupled to the first support 142 of the chassis 14. Furthermore, the top end 144 (e.g., the top end of the mounting assembly) of the rear right shock absorber assembly 130 is selectively coupled to the second mount 148 of the cab 12 via the second washer 182 and the second fastener 150. The bottom end 146 (e.g., the bottom end of the shock absorber) of the rear right shock absorber assembly 130 is coupled to the second support 152 of the chassis 14. In addition, the brace 118 is coupled to the top end 132 of the rear left shock absorber assembly 116 via the third fastener 158 and to the top end 144 of the rear right shock absorber assembly 130 via the fourth fastener 160. Furthermore, the first end 122 of the tie rod 120 is coupled to the chassis 14, and the second end 124 of the tie rod 120 is coupled to the brace 118. To rotate the cab 12 from the illustrated working position to the maintenance position, the first fastener 140 and the first washer 180 may be removed from the top end 132 of the rear left shock absorber assembly 116, and the second fastener 150 and the second washer 182 may be removed from the top end 144 of the rear right shock absorber assembly 130. The cab 12 may then be rotated forwardly in the direction 58, while the tie rod 120, the brace 118, and the shock absorber assemblies remain coupled to the chassis 14.

While the cab 12 is coupled to the shock absorber assemblies, the shock absorbers of the shock absorber assemblies may absorb energy associated with movement/vibrations of cab 12. For example, when the work vehicle (e.g., at least one rear wheel of the work vehicle) encounters a protrusion on the ground (e.g., bump, ridge, etc.), the rear of the cab may be urged downwardly relative to the chassis. As a result, the shock absorbers may compress, thereby absorbing energy associated with the encounter. Accordingly, the energy transfer between the chassis and the cab may be reduced, thereby enhancing passenger comfort. In addition, when the work vehicle (e.g., at least one rear wheel of the work vehicle) encounters a recess in the ground (e.g., trench, divot, etc.), the rear of the cab may be urged upwardly relative to the chassis. As a result, the shock absorbers may expand, thereby absorbing energy associated with the encounter. Accordingly, the energy transfer between the chassis and the cab may be reduced, thereby enhancing passenger comfort. The shock absorbers may also dissipate energy associated with roll 32 and/or pitch 30 of the cab, thereby further enhancing passenger comfort.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A cab suspension system for a work vehicle, comprising:
   a front suspension assembly, comprising:
   at least one bracket configured to fixedly couple to a frame of a cab of the work vehicle, wherein the at least one bracket is configured to extend forwardly from a front face of the frame relative to a direction of travel;
   a support element having a torsion bar and a pair of longitudinal supports, wherein the torsion bar extends laterally between the pair of longitudinal supports, and each of the pair of longitudinal supports is configured to rotatably couple to a chassis of the work vehicle; and
   a damping assembly coupled to the support element and configured to couple to the chassis;
   wherein the at least one bracket is rotatably coupled to the support element at a pivot joint assembly, and the at least one bracket is configured to position the pivot joint assembly forward of the cab relative to the direction of travel while the at least one bracket is coupled to the frame of the cab.

2. The cab suspension system of claim 1, wherein the damping assembly comprises at least one shock absorber having a damper, a spring, or a combination thereof.

3. The cab suspension system of claim 1, wherein the at least one bracket comprises a first bracket configured to be positioned on a first lateral side of a vertical centerline of the cab, and a second bracket configured to be positioned on a second lateral side of the vertical centerline, opposite the first lateral side; and
   wherein the first bracket is rotatably coupled to the support element at a first pivot joint of the pivot joint assembly, and the second bracket is rotatably coupled to the support element at a second pivot joint of the pivot joint assembly.

4. The cab suspension system of claim 3, wherein the damping assembly comprises a first shock absorber and a second shock absorber, the first and second shock absorbers are coupled to the torsion bar of the support element, the first shock absorber is positioned closer to the vertical centerline than the first pivot joint, and the second shock absorber is positioned closer to the vertical centerline than the second pivot joint.

5. The cab suspension system of claim 1, wherein the pivot joint assembly comprises a bushing disposed between the at least one bracket and the support element.

6. The cab suspension system of claim 1, wherein the support element includes at least one recess configured to receive the at least one bracket.

7. The cab suspension system of claim 1, wherein the support element is configured to position each of the pair of longitudinal supports laterally inward from a laterally outward surface of the chassis.

8. A cab suspension system for a work vehicle, comprising:
   a rear suspension assembly, comprising:
   a first shock absorber assembly and a second shock absorber assembly, wherein each of the first and second shock absorber assemblies has a first end configured to couple to a cab of the work vehicle and a second end configured to couple to a chassis of the work vehicle;
   a brace extending laterally between the first end of the first shock absorber assembly and the first end of the second shock absorber assembly relative to a direction of travel of the work vehicle, wherein the first end of the first shock absorber assembly and the first end of the second shock absorber assembly are coupled to the brace; and
   a tie rod having a first end configured to rotatably couple to the chassis of the work vehicle and a second end rotatably coupled to the brace;
   wherein the first end of the first shock absorber assembly and the first end of the second shock absorber assembly are configured to be decoupled from the cab without decoupling the brace from the first end of the first shock absorber assembly and the first end of the second shock absorber assembly.

9. The cab suspension system of claim 8, wherein at least one of the first and second shock absorber assemblies includes a shock absorber having a damper, a spring, or a combination thereof.

10. The cab suspension system of claim 8, wherein the rear suspension assembly comprises a first fastener configured to selectively couple the first end of the first shock absorber assembly to the cab and a second fastener configured to selectively couple the first end of the second shock absorber assembly to the cab.

11. The cab suspension system of claim 8, wherein the first end of the first shock absorber assembly is coupled to the brace with a third fastener, and the first end of the second shock absorber assembly is coupled to the brace with a fourth fastener.

12. The cab suspension system of claim 8, wherein the tie rod is positioned laterally inward from the first shock absorber assembly and from the second shock absorber assembly.

13. The cab suspension system of claim 8, wherein the second end of the tie rod is positioned laterally inward from the first end.

14. The cab suspension system of claim 8, wherein each of the first and second shock absorber assemblies is configured to be disposed within a respective tower support of the chassis.

15. A cab suspension system for a work vehicle, comprising:
   a front suspension assembly, comprising:
   at least one bracket configured to fixedly couple to a frame of a cab of the work vehicle, wherein the at least one bracket is configured to extend forwardly from a front face of the frame relative to a direction of travel;
   a support element having a torsion bar and a pair of longitudinal supports, wherein the torsion bar extends laterally between the pair of longitudinal supports, and each of the pair of longitudinal supports is configured to rotatably couple to a chassis of the work vehicle; and
   a damping assembly coupled to the support element and configured to couple to the chassis;
   wherein the at least one bracket is rotatably coupled to the support element at a pivot joint assembly, and the at least one bracket is configured to position the pivot joint assembly forward of the cab relative to the direction of travel while the at least one bracket is coupled to the frame of the cab;
   a rear suspension assembly, comprising:
   a first rear shock absorber assembly and a second rear shock absorber assembly, wherein each of the first and second rear shock absorber assemblies has a first end configured to couple to the cab of the work vehicle and a second end configured to couple to the chassis of the work vehicle;

a brace extending laterally between the first end of the first rear shock absorber assembly and the first end of the second rear shock absorber assembly relative to the direction of travel of the work vehicle, wherein the first end of the first rear shock absorber assembly and the first end of the second rear shock absorber assembly are coupled to the brace; and a tie rod having a first end configured to rotatably couple to the chassis of the work vehicle and a second end rotatably coupled to the brace.

16. The cab suspension system of claim 15, wherein the first end of the first rear shock absorber assembly and the first end of the second rear shock absorber assembly are configured to be decoupled from the cab without decoupling the brace from the first end of the first rear shock absorber assembly and the first end of the second rear shock absorber assembly.

17. The cab suspension system of claim 16, wherein the rear suspension assembly comprises a first fastener configured to selectively couple the first end of the first rear shock absorber assembly to the cab and a second fastener configured to selectively couple the first end of the second rear shock absorber assembly to the cab.

18. The cab suspension system of claim 15, wherein the tie rod is positioned laterally inward from the first rear shock absorber assembly and from the second rear shock absorber assembly.

19. The cab suspension system of claim 15, wherein the at least one bracket comprises a first bracket configured to be positioned on a first lateral side of a vertical centerline of the cab, and a second bracket configured to be positioned on a second lateral side of the vertical centerline, opposite the first lateral side; and wherein the first bracket is rotatably coupled to the support element at a first pivot joint of the pivot joint assembly, and the second bracket is rotatably coupled to the support element at a second pivot joint of the pivot joint assembly.

20. The cab suspension system of claim 19, wherein the damping assembly comprises a first front shock absorber and a second front shock absorber, the first and second front shock absorbers are coupled to the torsion bar of the support element, the first front shock absorber is positioned closer to the vertical centerline than the first pivot joint, and the second front shock absorber is positioned closer to the vertical centerline than the second pivot joint.

* * * * *